US006577497B1

(12) United States Patent
Kanevsky et al.

(10) Patent No.: US 6,577,497 B1
(45) Date of Patent: Jun. 10, 2003

(54) USER-FRIENDLY AUTOMATIC ASSEMBLER PC SYSTEM

(75) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/584,277

(22) Filed: May 31, 2000

(51) Int. Cl.[7] .................................................. G06F 1/16
(52) U.S. Cl. .................... 361/683; 340/542; 312/223.2; 248/551
(58) Field of Search ................................ 361/683–687, 361/724–727; 340/542, 543, 825.31; 364/708.1; 312/223.1–223.6; 248/551–553

(56) References Cited

U.S. PATENT DOCUMENTS

| | | | | |
|---|---|---|---|---|
| 5,986,881 A | * | 11/1999 | Yang | 361/685 |
| 6,246,572 B1 | * | 6/2001 | Myers et al. | 361/683 |
| 6,327,151 B1 | * | 12/2001 | Chen et al. | 361/726 |

* cited by examiner

*Primary Examiner*—Darren Schuberg
*Assistant Examiner*—Hung Van Duong
(74) *Attorney, Agent, or Firm*—Dilworth & Barrese, LLP

(57) ABSTRACT

A system and method for assembling and disassembling a personal computer or components within a personal computer is disclosed. In the system and method, a computer case can be opened and closed, and computer components can be latched or unlatched, by means of a control program and locking devices that are remotely controlled by the control program.

33 Claims, 4 Drawing Sheets

USER-FRIENDLY AUTOMATIC ASSEMBLER PC SYSTEM

BACKGROUND OF THE INVENTION

1. Field of the Invention

This invention relates to a device and method for assembling and disassembling computers and, in particular, to a system and method of locking and unlocking embedded locking devices by remote control.

2. Description of the Related Art

Presently, it seems that only a small group of people can actually take apart a personal computer (PC) and put it back together again. However, minor maintenance tasks, such as replacing a card or installing RAM (Random Access Memory) memory, require that the computer be partially disassembled. As a result, these minor maintenance tasks often entail a call to a computer expert or IT (Information Technology) department technician to get a rather mundane task completed.

In addition, disassembling a computer can be time-consuming as well as counter-intuitive. Thus, even with a computer expert or IT technician, an inordinate amount of time is often spent on these minor maintenance tasks. This, in turn, results in either an expensive bill from the computer expert or an inefficient use of the IT department's resources.

Therefore, there is a need for a user-friendly assembling/disassembling system and method for personal computers. This system should offer an intuitive means for a non-technical person to assemble/disassemble a computer without assistance.

SUMMARY OF THE INVENTION

An object of this invention is to provide a system and method for controlling locking devices embedded in a personal computer.

Another object of this invention is to provide a system and a method for remotely controlling, through a computer terminal, locking devices embedded in a personal computer.

Another object of the invention is to provide a system for remotely controlling, by means of a wireless connection, locking devices embedded in a personal computer.

To accomplish the above and other objects, a system and method for controlling locking devices embedded in a personal computer is proposed. Using the system and method, a computer case can be opened and closed, and computer components can be latched or unlatched, by means of a control program and locking devices that are remotely controlled by the control program.

BRIEF DESCRIPTION OF THE DRAWINGS

The foregoing and other objects, aspects and advantages will be better understood from the following detailed description of preferred embodiments of the invention with reference to the following drawings:

FIG. 3 is a block diagram of a locking device controlled remotely by a wireless device according to an embodiment of the present embodiment;

DETAILED DESCRIPTION OF THE PREFERRED EMBODIMENTS

In the preferred embodiment of the present invention, locking devices, which can be controlled remotely, are embedded in personal computers at various points of contact. These locking devices, which will be described more fully below, may be installed when the computer is originally manufactured, or attached during a refurbishment. In addition, locking devices could be attached piecemeal, depending on the needs of the user.

Figure 1:
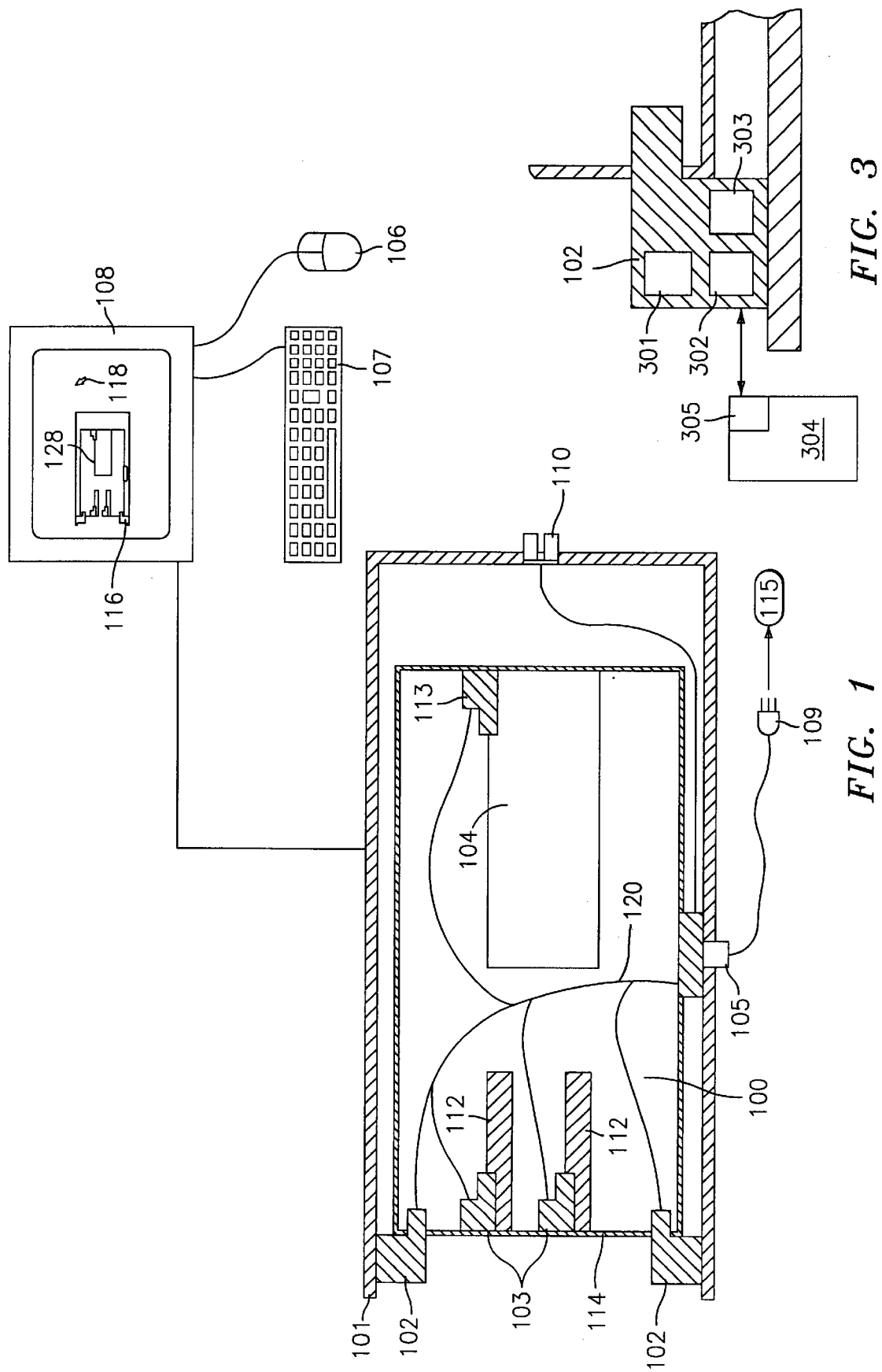
FIG. 1 is a block diagram of a personal computer system with remotely controlled locking devices according to one embodiment of the present invention.

One embodiment of the invention, in which the locking devices are controlled by the personal computer they are embedded in, will be described with reference to FIG. 1. In FIG. 1, a pair of locking devices, case locks 102, are used to secure the computer case 101 to the superstructure, or mounting plate 100, holding the motherboard. The case locks, when opened, would allow a person to remove the computer case 101 and work with the mounting plate 100. Another pair of locking devices, card locks 103, are used to secure computer cards 112 in place in their sockets in the mounting plate 100. Computer cards, such as a modem card, a wireless card, a sound card, a video card, etc., could be attached and removed using the card locks 103. Another locking device, hard drive lock 113, secures the hard drive 104 to the mounting plate 100. This lock would allow a person to attach and remove a hard drive for repair or analysis purposes. In another embodiment, a locking device could be used to secure accelerator cards, or RAM memory chips, to the motherboard.

All of these locking devices, 102, 103, and 113, are connected to the same wire 120, as shown by FIG. 1, which represents the fact that they share the same power supply. The locking device power supply is separate from the power supply for the motherboard, hard drive, etc. An external power source 115 supplies power through a plug 109 to the internal computer power outlet 105. The internal computer power outlet 105 supplies power to the motherboard, hard drive, etc. separately from the locking devices. Two buttons 110 connected to the internal computer power outlet allow a person to turn either power supply on or off. This allows the locking devices to remain on, while the computer is off, and vice-versa.

The embedded locking devices are controlled directly from the motherboard. Although not shown in FIG. 1, the connections between the motherboard and each locking device could be implemented in any number of ways, and will mostly depend on the architecture of the motherboard and the mounting plate, as well as the location of the individual locking device.

Figure 7:
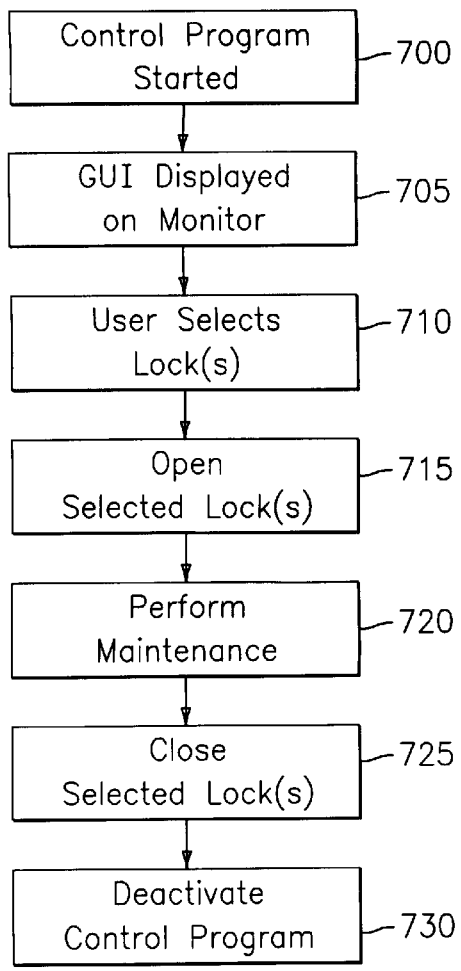
FIG. 7 is a flowchart of a locking/unlocking method according to an embodiment of the present invention.

A procedure by which a user controls these locking devices according to the preferred embodiment of the present invention will be described with reference to FIGS. 1 and 7. First, the user, by means of a keyboard 107 in FIG. 1, activates a control program, in step 700 in FIG. 7. The control program, which would be resident in the hard drive, or possibly the system ROM or ROM BIOS, is used to activate the appropriate connection on the motherboard in order to activate the locking device. The control program initiates a Graphical User Interface (GUI) 128 in FIG. 1, which is displayed on the computer's monitor in step 705 in FIG. 7. The GUI 128 in the preferred embodiment provides a representation of the computer itself, with emphasis on the locking devices provided by a color or flashing. As shown in FIG. 1, the user, by means of the mouse 106 in FIG. 1, can manipulate the cursor 118 to select one of the locking device icons, such as the lower case lock 102, as indicated in the GUI 128 by reference number 116. This selection of one or more locks corresponds to step 710 in FIG. 7. When the user double-clicks on icon 116, thus selecting it, the computer sends a control signal to initiate two-way communication, and to determine the locking device's current status (i.e., open/closed).

Once selected, icon 116 would be indicated by either an active "open" lock icon or an active "closed" icon to show the user the current status of the lower case lock 102. Different icons are, of course, not necessary, and the status of a locking device could be indicated by colors, shading, blinking, etc. At this point, the user can control the locking device(s) to open (or close) with a further command to the control program, in step 715. This command could be a mouse click, a double-click, a keystroke, or series of keystrokes. In another embodiment, buttons are built into keyboard 106 that represent each lock in the computer, and these keys are used to activate the control program and control the locking devices. In this embodiment, a GUI is not necessarily needed. After the appropriate locking devices are opened, whatever maintenance that is needed is performed in step 720. The maintenance could be the removal or installation of components, such as computer cards, RAM, a hard drive, etc., or any type of maintenance that requires access to the motherboard. When the maintenance is finished, the user controls the locking device(s) to close in step 725. In step 730, the control program deactivates, either by user command, or automatically.

Figure 2:
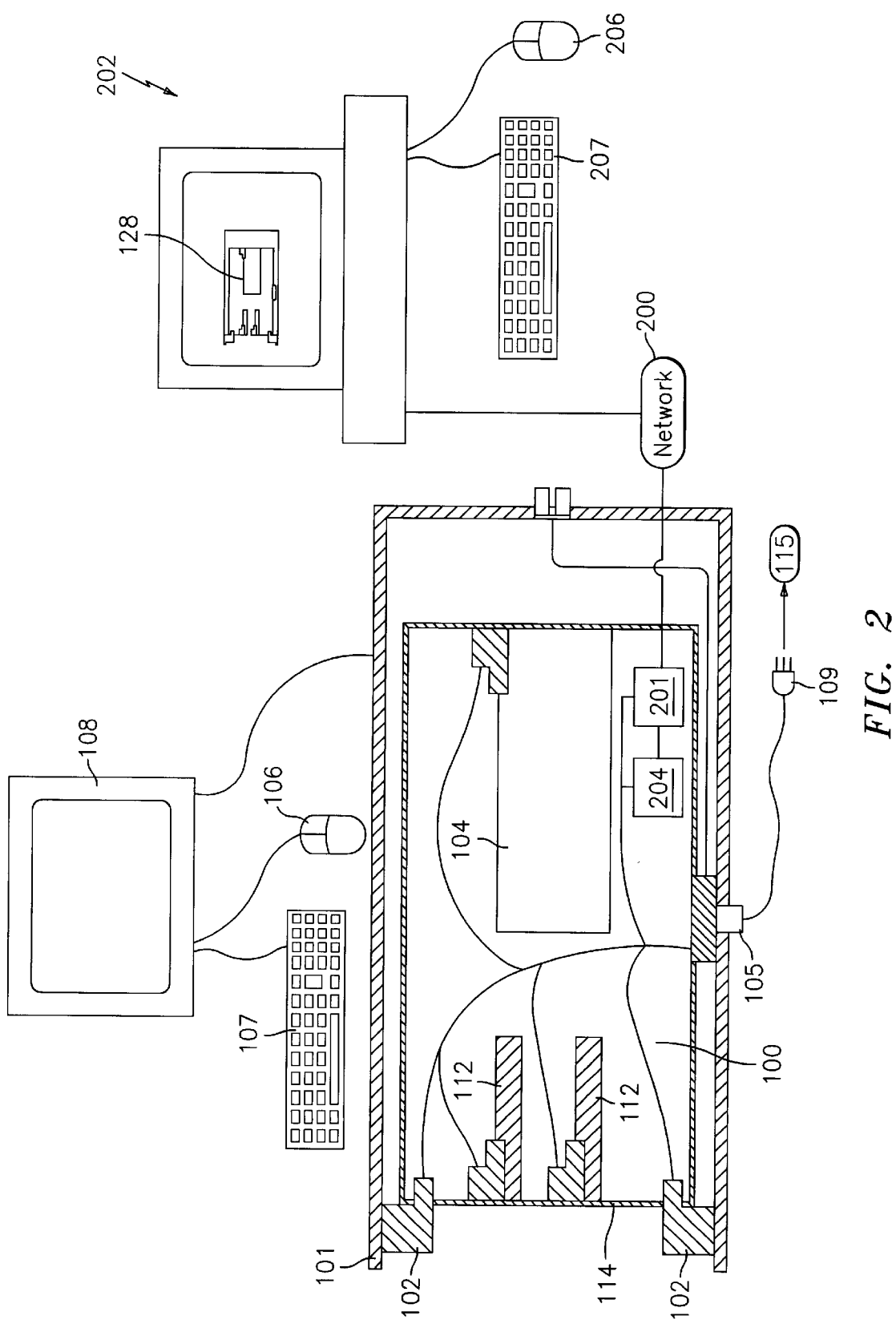
FIG. 2 is a block diagram of a personal computer system with remotely controlled locking devices according to another embodiment of the present embodiment.

Another embodiment of the invention, in which the locking devices are remotely controlled by a different computer, will be described with reference to FIG. 2. In FIG. 2, the same computer as shown in FIG. 1 is on the left. In addition, the mounting board 114 has an additional component, a communication device 201. Communication device 201 could be an embedded modem, a network card, a wireless device, or any type of networking communication device. Communication device 201 is connected to a network 200, which could be, for example, an Ethernet Local Area Network (LAN) or the Internet, and is also powered by the separate power supply powering the locking devices. The communication device 201 could also be powered by the same power supply as the motherboard, but that would mean it would not work when the motherboard power supply was turned off. The communication device 201 is also connected to a microcontroller 204, which is connected to each locking device in order that it may provide control signals to each locking device. Microcontroller 204 is also powered by the same separate power supply as the locking devices, and can remain on when the computer 100 is off.

Another computer 202 is also connected to the network 200. In this embodiment, computer 202 is running a GUI program 203, as seen in its monitor, which is similar to the GUI program in FIG. 1. However, this GUI program, although running on computer 202, has a network connection with microcontroller 204 in computer 100 via the network 200 and the communication device 201. This allows a user at computer 202 to remotely control the locking devices embedded in computer 100. Because the microcontroller 204 and the communication device 201 are powered by the same separate power supply as the locking devices, the user could manipulate computer 100's locking devices when computer 100 was turned off. This is helpful in cases where it is best to not leave the motherboard powered up while manipulating items on or in the motherboard. In addition, in a situation where computers 100 and 202 are nearby, such as a networked office, a user could remain at keyboard 207 of computer 202 while manually assembling or disassembling computer 100.

Although computers 100 and 202 are connected through network 200 in FIG. 2, the same principles would work if a computer-to-computer connection was established. Such a connection could be made via parallel, serial, USB, Firewire, or other computer port. The port being used to implement this embodiment of the invention would be connected to microcontroller 204, in the same manner as communication device 201 in FIG. 2. Similarly, the connected computer could manipulate the locking devices in the other computer, even when the other computer was off, because of the separate power supply for the microcontroller 204 and the locking devices.

Although the embodiments in FIGS. 1 and 2 use a GUI program to control the locking devices, other program, such as a command-line prompt program, could be substituted. Furthermore, the embodiments in FIGS. 1 and 2, as well as the embodiments discussed in the last paragraph and below, are not mutually exclusive. In other words, both the motherboard, like in FIG. 1, and a microcontroller 204, like in FIG. 2, could have access to the control signal paths of the locking devices, allowing both self-manipulation and master-slave manipulation.

In yet another embodiment, shown in FIG. 3, each locking device is controlled by its own embedded microchip and powered by its own battery. In this embodiment, no wires or connections to the motherboard or an outside power source are necessary. Thus, this embodiment of the invention could be implemented on any personal computer, with very little alteration, and with no changes to the motherboard or the internal power connections. As shown in FIG. 3, locking device 102, corresponding to the lower case lock, has its own battery 301, and its own microchip 303. The battery 301 is preferably a lithium-ion battery. In other embodiments, battery 301 is rechargeable, allowing for a connection with a power source, or removable, allowing for easy replacement and, perhaps, the use of cheaper batteries. Microchip 303 controls the locking mechanism and receives signals from the receiver 302. Transmitter/receiver 302 is a wireless receiver, operating in the 2.9 Gigahertz range in this embodiment, and individually identifiable. "Individually identifiable" in this context means that each transmitter/receiver in each locking mechanism would have a unique identification code, similar to the individual Medium Access Control (MAC) layer addresses of Ethernet cards. In addition, all of the locking devices in a single computer would have a unique code identifying the computer in which they are embedded. This computer ID would be unique for every computer, and programmed into the locking devices when they are originally installed.

In FIG. 3, a palm or hand-held computer 304 has a wireless transmitter/receiver 305 which can communicate with receiver 302. In this manner, palm computer 304 has a GUI program controlling locking device 102 through receiver 302 and microchip 303. The GUI program resident on palm computer 304 preferably has a similar view as the monitor in FIGS. 1 and 2. However, the GUI program in palm computer 304 creates the icons using wireless signals. In this embodiment, the transmitter/receiver 302 in each locking device would power up at certain intervals and listen for a paging signal. If a paging signal is received, the transmitter/receiver 302, under control of microchip 303, broadcasts its ID, its relative location, and its computer ID. In this manner, the GUI program resident in palm computer 304 can build an image of the locking devices in one or more nearby computers.

Although FIG. 3 shows the locking device's transmitter/receiver 302 communicating with a palm computer, any wireless-enabled device with the appropriate control program could control the locking device. For example, the personal computer in which locking device 102 is attached may have a wireless card and the GUI program, thus allowing it to control its own internal locking devices. Further, a personal computer enabled in that manner would be able to control the locking devices in other nearby personal computers. The microchip 303 in the locking device 102 may be programmed to allow only authorized access. This could be achieved by a system password, a handshake procedure, or any other authorization procedure. Lastly, this embodiment allows for individual locking devices in a personal computer to be replaced. When a new locking device is installed, the palm computer 304 programs the appropriate computer ID into the new locking device, based on the image made from all of the other locking devices.

Figure 4:
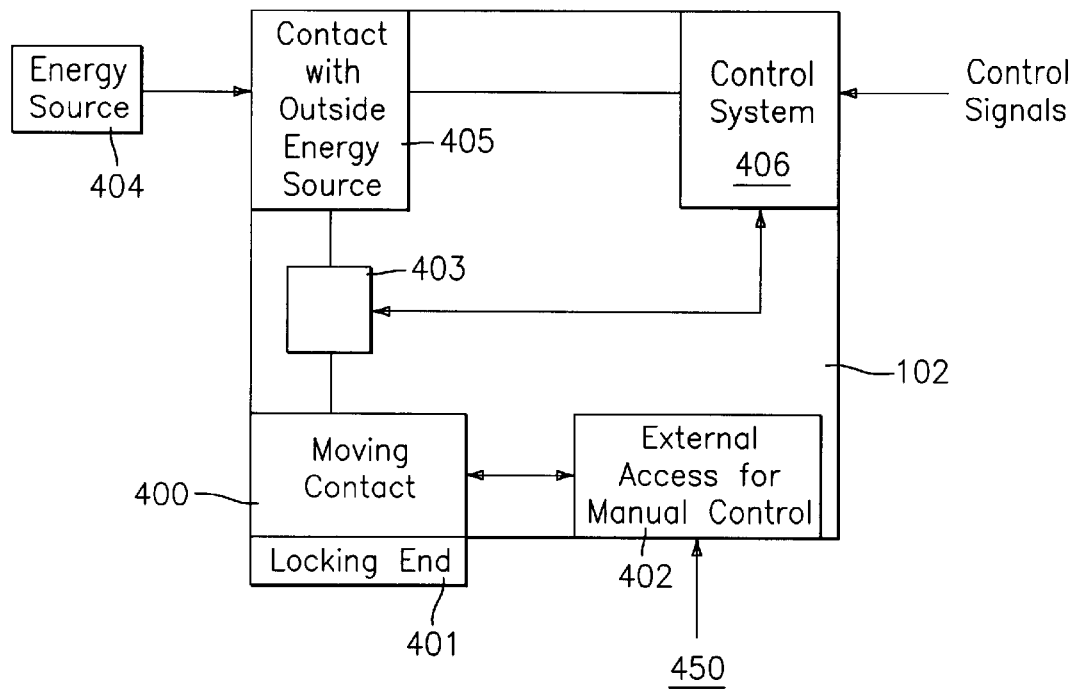
FIG. 4 is a block diagram of the functional units inside of a locking device according to an embodiment of the present invention.

A description of the internal workings of a locking device according to an embodiment of the present invention will be given below, with reference to FIG. 4. Broken down into functional units, the locking device has a control system 406, and a locking mechanism, comprised of a moving contact 400 and a locking end 401. An energy source 404 is connected with a contact 405 in the locking device, and the contact is, in turn, connected to the control system 406 and a switch 403. In this embodiment, item 403 is a switch, but for locking mechanisms that require different voltages or currents to control them, item 403 would be an electronic device capable of varying current or voltage, based on control signals from control system 406. The switch 403 turns power to the moving contact 400 in the locking mechanism on and off. In this manner, the control system 406, upon receipt of control signals, turns switch 403 on and off in order to manipulate the locking mechanism. In addition, a module 402 for external access is provided so that the switch may be manually controlled by manipulations 450 to open or shut. This is helpful if there is a power problem.

Figure 5:
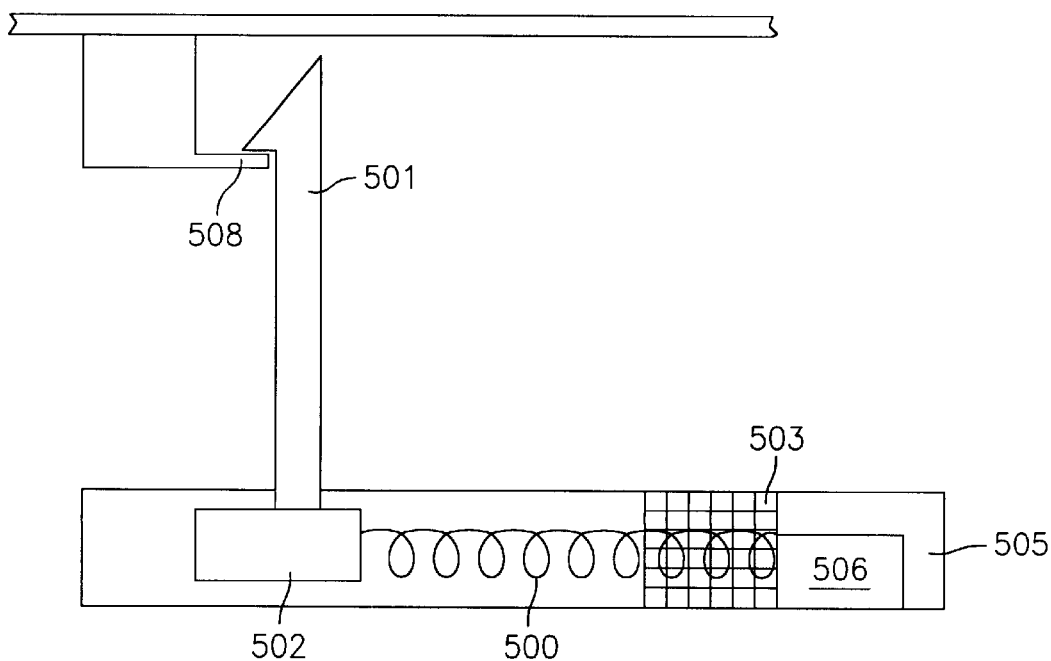
FIG. 5 is a block diagram of a mechanical latching lock implementation of a locking device according to an embodiment of the present invention.

Two different embodiments of a locking mechanism according to the present invention will be described below, with reference to FIGS. 5 and 6. In FIG. 5, a latching embodiment of the locking mechanism is shown; in FIG. 6, a screw embodiment of the locking mechanism is shown.

In the latching mechanism 505 of FIG. 5, a latch 501 latches and unlatches from a lip 508. The latch 501 is latched or unlatched by means of its attachment to block 502, which is moved by spring 500. Spring 500 is contracted or expanded using electric currents through an electromagnetic grid 503. The currents are controlled by a control system 506, which is functionally equivalent to control system 406 in FIG. 4. Likewise, electromagnetic grid 503, spring 500, and latch 501/502 are functionally equivalent to switch 403, moving contact 400, and locking end 401, respectively, in FIG. 4.

Figure 6:
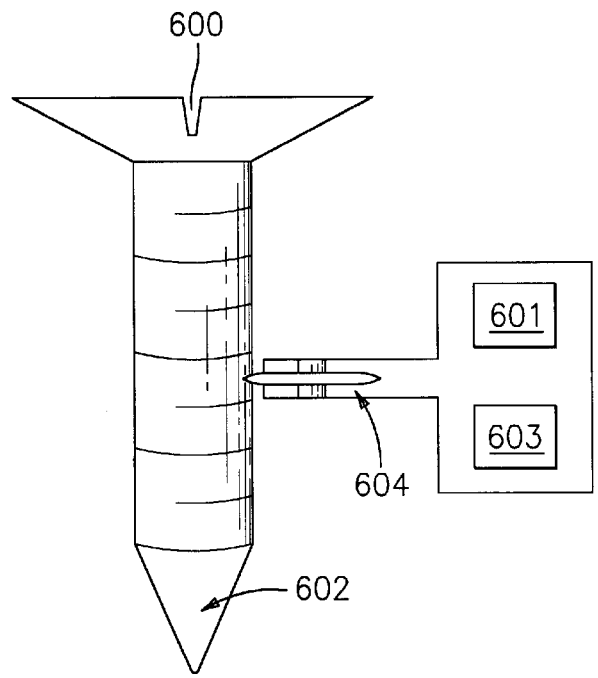
FIG. 6 is a block diagram of a screw lock implementation of a locking device according to an embodiment of the present invention.

In the screw mechanism of FIG. 6, a screw, which can be screwed and unscrewed manually using indentation 600, can lock into a surface by its locking end 602. This ability to manually lock and unlock is functionally equivalent to the manual access 402 in FIG. 4. In addition, the screw can be manipulated by a wheel 604, which is threaded into the screw. The wheel can unscrew and unscrew the screw revolving in the appropriate direction. The wheel is controlled by a chip 603, which is functionally equivalent to control system 406 in FIG. 4. The chip 603 is connected to transmitter/receiver 601 which receives wireless control signals, which the chip 603 implements. Although not shown, the wheel 604, chip 603, and transmitter/receiver 601 may be powered in a number of ways, including battery, computer power supply or a separate power supply.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A system for assembling and disassembling a personal computer and components in a personal computer, comprising:
   at least one locking device for locking and unlocking at least two elements, said two elements being components or parts of a personal computer;
   a control program for controlling the at least one locking device;
   a control processor running said control program;
   a communication link between said processor and the at least one locking device.

2. The system as recited in claim 1, wherein the control processor is the same as a Central Processing Unit (CPU) of the personal computer.

3. The system as recited in claim 1, wherein the communication link comprises:
   at least one wired connection built into one of a motherboard, a mounting plate, and a case of the personal computer.

4. The system as recited in claim 1, further comprising:
   a power supply system, separate from a power supply of the personal computer, for powering the at least one locking device; and
   a control switch, accessible by a user of the personal computer, for turning said power supply on and off.

5. The system as recited in claim 1, further comprising:
   a battery for powering the at least one locking device.

6. The system as recited in claim 1, wherein the control processor is separate from a Central Processing Unit (CPU) for the personal computer, and is resident within the personal computer.

7. The system as recited in claim 1, wherein the processor is a Central Processing Unit (CPU) for a palm computer.

8. The system as recited in claim 1, wherein the communication link comprises:
   a network;
   a connection between the control processor and the network; and
   a connection between the personal computer and the network.

9. The system as recited in claim 8, further comprising:
   a communication device in the personal computer, said communication device being connected to the connection with the network;

a microcontroller in the personal computer, said microcontroller being connected to the communication device in order to receive commands from the control processor over the network, said microcontroller further having a microcontroller communication link with at least one locking device in the personal computer in order to transmit control signals to said at least one locking device.

10. The system as recited in claim 1, wherein the locking device comprises:
   a control system for receiving control signals from the control processor and for controlling at least one regulator;
   said at least one regulator being connected to an energy source and at least one moving contact, for regulating the power supplied to the at least one moving contact;
   said at least one moving contact having a locking end for locking the at least two elements together.

11. The system as recited in claim 10, wherein the locking device further comprises:
   an external access for manually controlling the locking end of the at least one moving contact.

12. The system as recited in claim 1, wherein the at least one locking device comprises:
   an electromagnetic grid;
   a spring;
   a latch; and
   a control system which controls the electromagnetic grid so as to cause the spring to expand and contract, thus moving the latch.

13. The system as recited in claim 1, wherein the at least one locking device comprises:
   a motor that powers a wheel, which is threaded into the threads of a screw; and
   a control system which controls the motor so that the wheel's rotation causes the screw to move.

14. The system as recited in claim 1, wherein the control program comprises:
   a communication module for providing control signals over the communication link to the at least one locking devices;
   an interface module for communicating information to a user.

15. The system as recited in claim 14, wherein the interface module comprises a Graphical User Interface (GUI) module which provides a graphical interface on a display, wherein the GUI displays a representation of the personal computer, said representation showing the at least one locking device, such that a user may control the at least one locking device by manipulating the on-screen representation.

16. The system as recited in claim 1, further comprising:
   a control wireless transmitter connected to the control processor for transmitting control signals to the at least one locking device; and
   a locking device wireless receiver connected to the at least one locking device for receiving control signals from the control processor.

17. The system as recited in claim 1, further comprising:
   a control wireless transceiver connected to the control processor for transmitting control signals to the at least one locking device, and for receiving signals from the at least one locking device; and
   a locking device wireless transceiver connected to the at least one locking device for receiving control signals from the control processor, and for transmitting signals to the control processor.

18. The system as recited in claim 1, wherein at least one locking device locks together a mounting plate and a case of the personal computer.

19. The system as recited in claim 1, wherein at least one locking device locks a computer card into a socket in a motherboard of the personal computer.

20. The system as recited in claim 1, wherein at least one locking device locks a hard disk drive onto a mounting plate of the personal computer.

21. A locking device for use in locking and unlocking at least two components in a personal computer, comprising:
   a control system for receiving control signals and for controlling a regulator, said control signals originating at a control processor;
   said regulator being connected to an energy source and a moving contact, for regulating the power supplied to the moving contact; and
   said moving contact having a locking end for locking the at least two elements together;
   wherein said control program has a communication link with the locking device and controls the locking device by sending signals over the communication link.

22. The locking device as recited in claim 21, wherein the locking device further comprises:
   an external access for manually controlling the locking end of the moving contact.

23. The locking device as recited in claim 21, wherein the regulator is an electromagnetic grid, the moving contact is a spring, the locking end is a latch, and the control system controls the electromagnetic grid so as to cause the spring to expand and contract, thus moving the latch.

24. The locking device as recited in claim 21, wherein the regulator is a motor, the moving contact is a wheel powered by the motor and threaded into the threads of a screw, the locking end is the screw, and the control system controls the motor so that the wheel's rotation causes the screw to move.

25. The locking device as recited in claim 21, further comprising:
   a battery for powering the locking device.

26. The locking device as recited in claim 21, further comprising:
   a wireless receiver for receiving control signals from the control processor.

27. The locking device as recited in claim 21, further comprising:
   a wireless transceiver for receiving control signals from the control processor, and for transmitting signals to the control processor.

28. A method of assembling and disassembling a personal computer and components in a personal computer, comprising the steps of:
   producing, by a control program, an interface by which a user may control locking devices;
   selecting, by a user, at least one locking device by manipulation of the interface; and
   opening the lock of at least one locking device by a further manipulation of the interface;
   wherein the at least one locking device locks and unlocks two components or parts of the personal computer; and
   wherein said control program has a communication link with the at least one locking device and controls the at least one locking device by sending signals over the communication link.

29. A method of assembling and disassembling a personal computer and components in a personal computer, comprising the steps of:

displaying a graphical user interface (GUI) representation of at least one locking device and a personal computer;

selecting, by a user, at least one locking device by manipulation of a cursor in the GUI representation; and opening the lock of at least one locking device by a further manipulation of the GUI representation;

wherein the at least one locking device locks and unlocks two components or parts of the personal computer; and wherein the GUI representation is produced by a control program, said control program having a communication link with the at least one locking device and controlling the at least one locking device by sending signals over the communication link.

30. The method as recited in claim 29, wherein the communication link comprises:

a control wireless transmitter connected to the control processor for transmitting control signals to the at least one locking device; and a locking device wireless receiver connected to the at least one locking device for receiving control signals from the control processor.

31. The method as recited in claim 29, wherein the communication link comprises:

a control wireless transceiver connected to the control processor for transmitting control signals to the at least one locking device, and for receiving signals from the at least one locking device; and a locking device wireless transceiver connected to the at least one locking device for receiving control signals from the control processor, and for transmitting signals to the control processor.

32. A control processor for assembling and disassembling a personal computer and components in a personal computer, comprising:

a computer usable medium having computer readable program code means embodied therein for controlling at least one locking device to lock and unlock at least two components of a personal computer;

computer readable program code means for producing a user interface; and computer readable program code means for communicating with at least one locking device.

33. A locking device for use in locking and unlocking at least two components in a personal computer, comprising:

a computer usable medium having computer readable program code means embodied therein for controlling a regulator;

computer readable program code means for receiving control signals;

said regulator being connected to an energy source and a moving contact, for regulating the power supplied to the moving contact; and said moving contact being moved when the power supply is regulated and having a locking end for locking the at least two components together.

* * * * *